United States Patent [19]

Shinosaki et al.

[11] Patent Number: 4,527,411
[45] Date of Patent: Jul. 9, 1985

[54] PROCESS FOR PRODUCING WALKING BAR MEMBERS FOR CONTINUOUS CASTING

[75] Inventors: Akira Shinosaki; Shinji Amako, both of Hirakata, Japan

[73] Assignee: Kubota Ltd., Osaka, Japan

[21] Appl. No.: 454,648

[22] Filed: Dec. 30, 1982

[30] Foreign Application Priority Data

Jan. 22, 1982 [JP] Japan .................................. 57-9285

[51] Int. Cl.³ ...................... B21D 51/16; B21D 28/00; B23P 13/00
[52] U.S. Cl. ......................................... 72/340; 72/369; 72/342; 29/157.3 R; 165/177; 164/447
[58] Field of Search ................. 72/340, 369, 367, 342, 72/415; 29/157.3 R; 164/447, 441; 165/170, 177; 138/DIG. 11, DIG. 8, 177

[56] References Cited

U.S. PATENT DOCUMENTS

| 1,888,807 | 11/1932 | Rivers | 72/246 |
| 1,968,540 | 7/1934 | Squires | 29/156.8 T |
| 2,433,055 | 12/1947 | Linden et al. | 72/342 |
| 2,442,850 | 6/1948 | Glesmann | 72/235 |
| 3,042,099 | 7/1962 | Neely | 72/369 |
| 3,239,002 | 3/1966 | Young | 165/177 |
| 3,340,717 | 9/1967 | Körner et al. | 72/367 |
| 3,662,582 | 5/1972 | French | 165/177 |
| 3,688,833 | 9/1972 | Bykov et al. | 164/447 |
| 3,967,489 | 7/1976 | Pohl et al. | 72/367 |
| 4,360,958 | 11/1982 | Kritzer | 165/177 |

FOREIGN PATENT DOCUMENTS

| 621196 | 11/1935 | Fed. Rep. of Germany | 72/370 |
| 843834 | 7/1952 | Fed. Rep. of Germany | 72/370 |
| 2555903 | 6/1977 | Fed. Rep. of Germany | 72/369 |
| 2921384 | 12/1979 | Fed. Rep. of Germany | 72/369 |
| 1308049 | 9/1962 | France | 72/369 |
| 624227 | 5/1949 | United Kingdom | 72/369 |
| 154073 | 7/1952 | United Kingdom | 72/369 |
| 145525 | 1/1962 | U.S.S.R. | 72/367 |
| 654340 | 3/1979 | U.S.S.R. | 72/367 |

Primary Examiner—Daniel C. Crane
Attorney, Agent, or Firm—Oblon, Fisher, Spivak, McClelland & Maier

[57] ABSTRACT

A process for manufacturing a walking bar member for continuous casting from an elongated tubular metal blank by heating the blank at a temperature of 550° to 1250° C., subjecting the heated blank to plastic working which achieves a working ratio of up to 65% or a flattening ratio of over 1 but not greater than 3.0 to flatten the blank into a tubular body by compression over the entire length thereof, and machining a surface of the tubular body at the side thereof to be brought into contact with a slab to smooth the surface and provide a reduced wall thickness, the working ratio and the flattening ratio being represented by $(D-H)/D \times 100$ and $W/H$, respectively, wherein D is the outside diameter of the blank before the plastic working, H is the minor diameter of the tubular body after the plastic working, and W is the major diameter of the tubular body after the plastic working.

10 Claims, 17 Drawing Figures

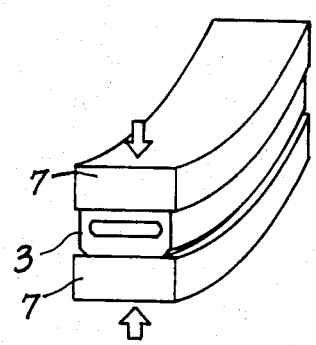
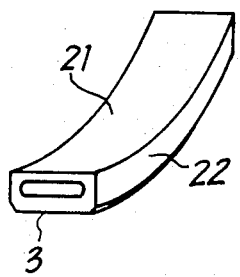
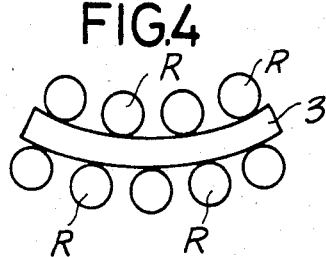
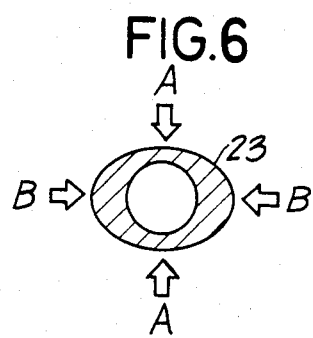
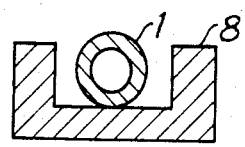
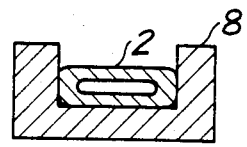
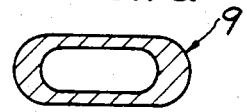
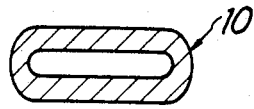

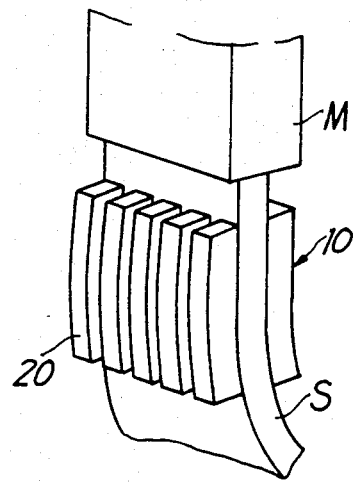
FIG.8 PRIOR ART
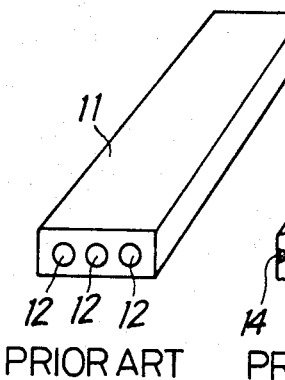
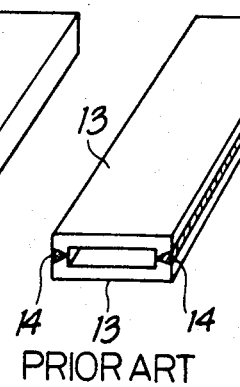
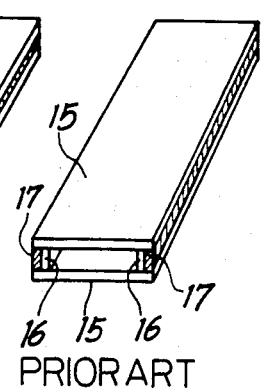
FIG.9 PRIOR ART
FIG.10 PRIOR ART
FIG.11 PRIOR ART

PROCESS FOR PRODUCING WALKING BAR MEMBERS FOR CONTINUOUS CASTING

BACKGROUND OF THE INVENTION

1. Field of the Invention

The present invention relates to a process for producing bar members for use in walking bar assemblies for continuous casting molds.

2. Description of the Prior Art

FIG. 8 shows a walking bar assembly 10 arranged immediately below a continuous casting mold M and comprising a plurality of bar members 20 arranged side by side along a slab S drawn from the mold M. By link means or the like (not shown), the assembly 10 is repeatedly movable up and down and toward and away from the slab S to lower the slab having a thin solidified shell and a high temperature while supporting the slab on its opposite sides. Each of the bar members 20 is a flat hollow tube having an elongated length of about 5 m and internally formed with a cooling channel or channels extending approximately over the entire length thereof. Cold water is supplied to the channels to cool the bar members themselves and indirectly cool the hot slab S in contact therewith. When the assembly is adapted to guide the slab S in a vertical position toward a horizontal direction immediately below the mold M, the bar members 20 are bent longitudinally along the direction of transport of the slab S.

Heretofore used as such walking bar members has been an elongated steel member 11 having a flat rectangular cross section and cooling water channels 12 formed by drilling as shown in FIG. 9, an assembly of a pair of steel channel members 13, 13 with their side edges opposed to each other and joined together by welds 14 as shown in FIG. 10, and an assembly of two flat steel plates 15, 15 and side wall members 16, 16 interposed therebetween at their side edges and joined to the plates by welds 17 as seen in FIG. 11. However, these walking bar members are cumbersome and costly to make. Bar members having drilled channels have been limited in the diameter of the cooling water channels formed, and the cooling effect achieved by the cold water passing therethrough is not always sufficient. On the other hand, bar members fabricated by welding have incurred problems with respect to the material utilized, such as corrosion resistance and strength of the weld zones, and are liable to bend, warp or otherwise deform during welding or heat treatment conducted before or after welding. Further when such members are made from stainless steel, heat-resistant steel or other special steel having low weldability, it is difficult to assemble the components by welding, so that there are limitations in the materials that are usable.

SUMMARY OF THE INVENTION

An object of the present invention is to produce a walking bar member for continuous casting from an elongated tubular metal blank by heating the blank at a temperature of 550° to 1250° C., subjecting the heated blank to plastic working which achieves a working ratio of up to 65% or a flattening ratio of greater than 1 but not greater than 3.0 to flatten the blank into a tubular body by compression over the entire length thereof, and cutting a surface of the tubular body at the side thereof to be brought into contact with a slab to smooth the surface and provide a reduced wall thickness.

The working ratio is represented by $(D-H)/D \times 100$, and the flattening ratio by $W/H$, wherein D is the outside diameter of the blank before the plastic working, H is the minor diameter of the tubular body after the plastic working, and W is the major outer diameter of the tubular body after the plastic working.

Another object of the invention is to produce a walking bar member by a greatly shortened period of working from a tubular blank of a metal material which is selected freely without being limited by its weldability.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 3a and 3b are diagrams showing a method of bending a flat hollow tubular body;

FIG. 4 is a diagram showing another method of bending the flat hollow tubular body;

FIGS. 5a and 5b are diagrams showing a blank in section before and after plastic working for flattening;

FIG. 6 is a cross sectional view showing a tubular blank of different shape;

FIGS. 7a and 7b are cross sectional views showing flat tubular bodies of other different shapes embodying the invention;

FIG. 8 is a diagram schematically showing walking bars arranged immediately below a continuous casting mold; and FIGS. 9, 10 and 11 are perspective views showing conventional walking bar members.

DETAILED DESCRIPTION OF THE PREFERRED EMBODIMENTS

Figure 1:
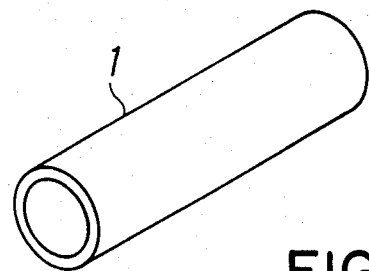
FIG. 1 is a perspective view showing an exemplary tubular blank according to the present invention.

As an embodiment of the invention, a process will be described for producing a walking bar member from a metal blank in the form of a circular tube having a uniform wall thickness as shown in FIG. 1. Examples of useful tubular blanks are those produced by centrifugal casting.

Figure 2A:
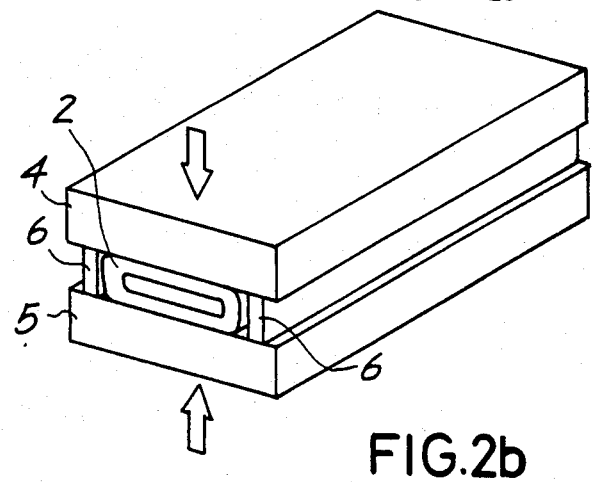
FIGS. 2a to 2d are diagrams showing steps of production according to the invention and a tubular body for illustrative purposes.
Figure 2B:
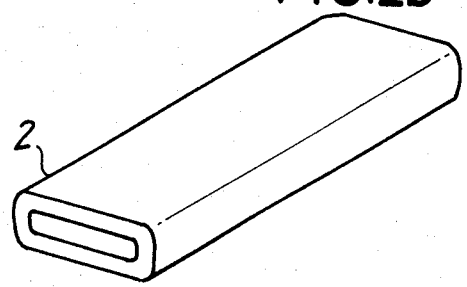

FIGS. 2a to 2d show the process for producing flat hollow tubular bodies. A tubular blank 1 is heated at a suitable temperature, placed between an upper die 4 and a lower die 5 of a molding machine such as a press and held in a compressed state from above and below over the entire length of the blank 1 for several tens of seconds, whereby the blank is molded into a flat hollow tubular body 2 having an approximately rectangular cross section (FIG. 2a). To give the tubular body 2 a predetermined minor diameter H, spacers 6, 6 are arranged prior to the press work on the lower die 5 on opposite sides of the blank 1, and the blank 1 is depressed by the upper die 4 until the die 4 comes into contact with the spacers 6, 6. The spacers 6, 6 have a height equal to the predetermined minor outer diameter H of the tubular body 2 minus the amount of elastic restoration of the tubular body 2. Accordingly when the upper die 4 is removed after pressing the blank 1 in contact with the spacers 6, 6, the flat tubular body 2 elastically restores itself by a known amount exactly to the desired minor outer diameter H.

The tubular body 2 thus obtained is machined on a major surface thereof at the side to be brought into contact with a slab to form a smooth surface 21 and at the same time to reduce the wall thickness between the hollow channel and the smooth surface 21. Machining work may be performed by milling, planing and so on. Thus the tubular body 2 is adapted to achieve an improved cooling effect on the slab by reducing the wall thickness of the side portion thereof to be brought into contact with the slab. The other side portion opposed to the smooth-surfaced portion remains uncut to retain the original wall thickness and give strength to the body 2 for use as a bar member.

Figure 2C:
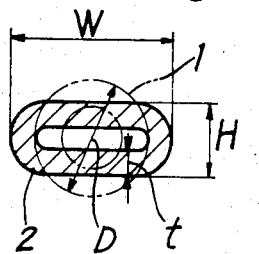
Figure 2D:
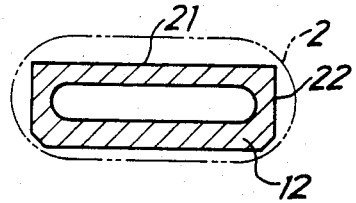

When required, a minor surface 22 is also machined to remove an excessive amount of the wall (FIG. 2d). For use as a curved walking bar member, the tubular body resulting from the above process is subjected to plastic working with the use of a shaping machine 7 having curved press surfaces, whereby a flat tubular body 3 can be obtained which is curved as desired (FIGS. 3a and 3b). Alternatively the curved walking bar member can be formed by passing the tubular body between the bending rollers R shown in FIG. 4 subsequent to the foregoing process.

The tubular blank 1 may be flattened by press work as placed in a mold D having opposite side walls 8 as seen in FIG. 5a. The blank can then be molded to a cross sectional shape in conformity with the width of the die as shown in FIG. 5b. This serves to eliminate, or reduce the amount of, the subsequent machining work for removing the excess portion of the side wall. Further alternatively the blank can be flattened by being compressed by rolls.

According to the process of the invention, the tubular blank is subjected to plastic working at a temperature of 550° to 1250° C. to facilitate working with reduced resistance to deformation. The upper temperature limit is set to inhibit the oxidation and deformation of the blank. The proper working temperature, which of course varies with the material of the blank, is preferably in the range of 900° to 1200° C., for example, in the case of 13Cr steel.

The working ratio to be achieved by the hot plastic working is defined as follows. The working ratio (%) is expressed by $(D-H/D \times 100$ wherein D is the outside diameter of the tubular blank 1 before the working, and H is the minor outer diameter of the flat tubular body 2 resulting from working as shown in FIG. 2c. The upper limit of the working ratio is 65% to prevent cracks from developing in the corner portions of the blank during the working. The lower limit of the working ratio is determined suitably in accordance with the use of the flat tubular body. For producing walking bar members, the working ratio is preferably about 40% and should not be lower than about 20%.

The flattening ratio to be achieved by the plastic working is defined as follows. The flattening ratio is expressed by W/H wherein W is the major outer diameter of the flat tubular body 2 resulting from the plastic working as shown in FIG. 2c. The flattening ratio, which is above 1, is limited to not greater than 3.0 since cracks will develop in the corner portions of the blank if the ratio is exceedingly large. The greater the flattening ratio W/H, the larger is the width of the surface to be brought into contact with the slab to produce a correspondinly enhanced effect to indirectly cool the slab. From this viewpoint, it is advantageous that the flattening ratio W/H be as great as possible within the range of up to 3.0. Preferably the ratio is at least 1.1, more preferably at least 1.5.

The flat hollow tubular body must have a wall thickness which gives the body the strength required for the contemplated use. When the tubular body is used as a walking bar member or the like, the wall thickness is generally about 5 to about 50 mm. The ratio of the minor outer diameter H to the wall thickness t, i.e., H/t, is of course in excess of 2. Although the ratio H/t is dependent on the diameter or circumferential length of the blank and on the flattening ratio desired, it is suitable that the ratio be usually up to about 5.0 from the viewpoint of assuring the strength required thereof as a member.

The tubular blanks to be used for this invention are preferably tubes prepared by centrifugal casting because they are relatively inexpensive to make and homogeneous in material. Since walking bar members can be produced without welding according to the invention, the material of the blank is not limited, with respect to weldability and can be selected relatively freely from among those forgeable and having mechanical strength desired. For example, low Ni—Cr steel is usable which contains up to 0.1% C, up to 1.0% Si, up to 1.5% Mn, 4–6% Ni and 10–14% Cr.

It was found possible to produce walking bar members from the above-mentioned low Ni—Cr steel by the process of the invention under the following conditions.

| Size of blank and product (in mm): | |
|---|---|
| Blank | 163 in O.D., 87 in I.D. and 4640 in length |
| Flat hollow tubular body | 213 in W and 97 in H |
| Heating temperature: | 1050° C. |
| Working ratio: | 40% |
| Flattening ratio: | 2.2 |
| Capacity of press machine: | 4000 tons |
| Method of forging: | free forging |

Useful tubular blanks are not limited to the tubular shape shown in FIG. 1 and having a circular cross section and a uniform wall thickness. For example, the tubular blank 23 shown in FIG. 6 is usable which has an uneven wall thickness and a circular cross section. When compressed in the directions A or B by hot plastic working, the blank 23 provides a flat tubular body 9 (wherein the wall thickness of the minor side is greater than the wall thickness of the major side) as shown in FIG. 7a or a flat tubular body 10 (wherein the wall thickness of the major side is greater than the wall thickness of the minor side) as shown in FIG. 7b.

The openings at opposite ends of the walking bar member thus prepared are thereafter closed, an inlet and outlet are provided for the member for passing cold water through the interior channel thereof, and plugs are attached to the member for installation on a walking bar frame.

According to the invention described above, walking bar members can be produced inexpensively from tubular metal blanks by hot working. The production process is simpler, takes a shorter period of time and is more efficient than conventional processes and is therefore suited to mass production. The walking bar members obtained have an improved quality and are free from detects attributable to the material and resulting from welding assembling procedures.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing a walking bar for continuous casting made of steel alloy of low weldability in the form of a flat tube having upper and lower opposed flat surfaces and a hollow interior over the entire length thereof, comprising:

heating a tubular metal blank at a temperature of 550° to 1250° C;

placing the heated blank between an upper die and a lower die of a press machine wherein a spacer having a height equal to a predetermined dimension to which the blank is to be compressed minus an amount of elastic restoration of the blank is placed between the upper die and the lower die;

moving the upper and lower die toward the other to a position where the dies are spaced apart by the height of the spacer compressing the heated blank on upper and lower surfaces thereof over the entire length thereof by compressive plastic working which achieves a working ratio of up to 65% pressing the blank into the flat tubular body with the upper and lower dies for a predetermined time period over the entire length of the blank; and machining at least one entire planar surface of the tubular body so as to smooth said surface, form a substantially planar surface, and reduce the wall thickness thereof between a hollow interior thereof and said smooth surface so as to increase a cooling effect of the wall, the thickness of which has been so reduced;

said working ratio being represented by $(D-H/D \times 100$ wherein D is the outside diameter of the blank before the plastic working and H is the minor outer diameter of the tubular body after the plastic working; and minor side walls of said tubular body having a larger wall thickness than a major upper wall thereof which is machined and is made thinner.

2. A process as defined in claim 1 wherein said working ratio further comprises a lower limit of 20%.

3. A process for producing a walking bar for continuous casting made of steel alloy of low weldability in the form of a flat tube having upper and lower opposed flat surfaces and a hollow interior over the entire length thereof, comprising:

heating a tubular metal blank at a temperature of 550° to 1250° C;

placing the heated blank between an upper die and a lower die of a press machine wherein a spacer having a height equal to a predetermined dimension to which the blank is to be compressed minus an amount of elastic restoration of the blank is placed between the upper die and the lower die;

moving the upper and lower die toward the other to a position where the dies are spaced apart by the height of the spacer compressing the heated blank on upper and lower surfaces thereof over the entire length thereof by compressive plastic working which achieves a flattening ratio of about 1.0 to not greater than 3.0 pressing the blank into the flat tubular body with the upper and lower dies for a predetermined time period over the entire length of the blank; and machining at least one entire planar surface of the tubular body so as to smooth said surface, form a substantially planar surface, and reduce the wall thickness thereof between a hollow interior thereof and said smooth surface so as to increase a cooling effect of the wall, the thickness of which has been so reduced;

the flattening ratio being represented by W/H wherein H is the minor outer diameter of the tubular body after plastic working and W is the major diameter of the tubular body after the plastic working; and minor side walls of said tubular body having a larger wall thickness than a major upper wall thereof which is machined and is made thinner.

4. A process as defined in claim 3 wherein said flattening ratio further comprises a lower limit of 1.5.

5. A process as defined in claim 1 or 3 wherein the ratio of the minor diameter H of the tubular body to a wall thickness t thereof, H/t, is within the range of greater than 2 to not greater than 5.0.

6. A process as defined in claim 1 or 3 wherein said step of compressive plastic working further comprises placing said blank in a die having a pair of parallel side walls spaced apart by a distance equal to the width of the walking bar, and said step of machining further comprises finishing the tubular body so as to have a width equal to the distance between the side walls and also have smooth side surfaces.

7. A process as defined in claim 1 or 3 which utilizes a press machine having curved press surfaces of which further comprises curving the tubular body resulting from the compressive plastic working by said press machine having curved press surfaces.

8. A process as defined in claim 1 or 3 and utilizing bending rollers, which further comprises curving the tubular body resulting from the compressive plastic working passing the tubular body between said bending rollers.

9. A process for producing a walking bar for continuous casting made of steel alloy of low weldability in the form of a flat tube having upper and lower opposed flat surfaces and a hollow interior over the entire length thereof, comprising:

heating a tubular metal blank at a temperature of 550° to 1250° C.;

pressing the heated blank on upper and lower surface thereof over the entire length thereof by compressive plastic working which achieves a working ratio of up to 65% so as to compress the blank into a flat hollow tubular body; and machining at least one entire planar surface of the tubular body so as to smooth said surface, form a substantially planar surface and reduce the wall thickness thereof between a hollow interior thereof and said smooth surface so as to increase a cooling effect of the wall, the thickness of which has been so reduced, and the working ratio being represented by $(D-H)/D \times 100$ wherein D is the outside diameter of the blank before the plastic working and H is the minor outer diameter of the tubular body after the plastic working; and minor side walls of said tubular body having a wall thickness that differs from that of a major upper wall thereof which is machined and is made thinner.

10. A process for producing a walking bar for continuous casting mode of steel alloy of low weldability in the form of a flat tube having upper and lower opposed flat surfaces and a hollow interior over the entire length thereof, comprising:

heating a tubular metal blank at a temperature of 550° to 1250° C.;

pressing the heated blank on upper and lower surfaces thereof over the entire length thereof by compressive plastic working which achieves a flattening ratio of about 1.0 to not greater than 3.0 so as to compress the blank into a flat hollow tubular body; and machining at least one entire planar surface of the tubular body so as to smooth said surface, form a substantially planar surface, and reduce the wall thickness thereof between the hollow interior thereof and said smooth surface so as to increase a cooling effect of the wall, the thickness of which has been so reduced, the flattening ratio being represented by W/H wherein H is the minor outer diameter of the tubular body after plastic working and W is the major diameter of the tubular body after the plastic working; and minor side walls of the tubular body having a wall thickness that differs from that of a major upper wall thereof which is machined and is made thinner.

* * * * *